(12) United States Patent
Liu

(10) Patent No.: US 7,845,614 B2
(45) Date of Patent: Dec. 7, 2010

(54) SHOCK-ABSORBING WHEEL MOUNTING STRUCTURE FOR JACK

(75) Inventor: Bin Liu, Shanghai (CN)

(73) Assignee: Shinn Fu Corporation, Taipei (TW)

( * ) Notice: Subject to any disclaimer, the term of this patent is extended or adjusted under 35 U.S.C. 154(b) by 885 days.

(21) Appl. No.: 11/735,246

(22) Filed: Apr. 13, 2007

(65) Prior Publication Data
US 2007/0284501 A1   Dec. 13, 2007

(30) Foreign Application Priority Data
Apr. 28, 2006   (AU)   ............................... 2006201791

(51) Int. Cl.
*B66F 3/00*   (2006.01)
(52) U.S. Cl. ................ 248/600; 248/565; 248/578; 248/129; 254/11
(58) Field of Classification Search ............... 248/565, 248/578, 600, 599, 618, 620, 129; 16/44, 16/46; 254/11
See application file for complete search history.

(56) References Cited

U.S. PATENT DOCUMENTS

| | | | | |
|---|---|---|---|---|
| 5,873,145 A | * | 2/1999 | Chou | ............................ 16/46 |
| 6,086,047 A | * | 7/2000 | Lee | ............................. 254/8 B |
| 6,505,816 B1 | * | 1/2003 | Hung | .......................... 254/8 B |
| 7,065,827 B2 | * | 6/2006 | Hsiao | ............................ 16/44 |
| 7,356,877 B2 | * | 4/2008 | Kim et al. | ...................... 16/32 |
| 7,431,265 B2 | * | 10/2008 | Yueh | .......................... 254/8 B |

FOREIGN PATENT DOCUMENTS

| | | |
|---|---|---|
| CN | 2734531 Y | 10/2005 |
| CN | 2742212 Y | 11/2005 |

OTHER PUBLICATIONS

Statement Regarding Related Foreign Application dated Sep. 22, 2010.

* cited by examiner

*Primary Examiner*—Terrell Mckinnon
*Assistant Examiner*—Steven M Marsh
(74) *Attorney, Agent, or Firm*—Lathrop & Gage LLP

(57) ABSTRACT

A shock-absorbing wheel mounting structure used in a horizontal jack is disclosed. The wheel mounting structure includes an axial sleeve (4) affixed to a rear wheel mount (5) of the horizontal jack (100), and a shaft (2), vertically slideably mounted in the axial sleeve (4) and riveted to a bracket (1). The bracket (1) supports a wheel (71). A compression spring (3) is sleeved onto the shaft (2) and stopped between a stop flange around the periphery of the shaft (2) and the top wall of the axial sleeve (4). This arrangement serves to impart a downward pressure to the shaft (2) relative to the axial sleeve (4).

5 Claims, 9 Drawing Sheets

SHOCK-ABSORBING WHEEL MOUNTING STRUCTURE FOR JACK

RELATED APPLICATIONS

This application claims priority to Australian Patent Application Serial No.: 2006201794, filed Apr. 28, 2006, entitled Shock-Absorbing Wheel Mounting Structure for Jack, the disclosure of which is incorporated herein by reference.

TECHNICAL FIELD

The present disclosed subject matter relates to the mounting arrangement of the wheels of a jack, and more particularly, to a shock-absorbing wheel mounting structure for a jack.

BACKGROUND

FIG. 1 shows the rear wheel mounting structure of a conventional horizontal jack, also known as a floor jack. According to this design, the rear wheel mounting structure is formed of a bracket 10 and a shaft 20. The bracket 10 supports a wheel 30. The shaft 20 is inserted through a mounting hole on a rear wheel mount 40 of the horizontal jack and then locked thereto with a locknut 50. The bottom end of the shaft 20 is inserted through a ball bearing 60 at the top side of the bracket 10 and then riveted to the bracket 10. The ball bearing 60 allows free rotation of the bracket 10 relative to the shaft 20.

This design exhibits drawbacks in that it does not allow for the adjustment of the elevation of the bracket 10 and the wheel 30. Continued long-term use of the horizontal jack results in one or more of the four wheels of the jack deviating from a once-common horizontal plane. When this occurs, the wheels become unbalanced. As a result, they may damage the ground, interfere with the movement of the jack, or produce a loud noise when the jack is moved on the ground. Additionally, when supporting a load, one or more of the wheels opposite the point of contact with the load on the lift arm of the jack, may move out of contact with the ground, destabilizing the lift, resulting in a dangerous situation.

SUMMARY

The present disclosed subject matter provides a shock-absorbing wheel mounting structure, which is designed for use in jacks, enabling the wheels of the jack to remain in constant and positive (pressing) contact with the ground, regardless of whether the jack is not supporting or supporting a load. To disclosed subject matter provides a shock-absorbing wheel mounting structure is formed of an axial sleeve, a shaft, and a compression spring. The axial sleeve is directly welded to a rear wheel mount of a horizontal jack, also known as a floor jack, in a vertical orientation. The shaft is slideably inserted through the axial sleeve, with its top end protruding over the top side of the axial sleeve and secured thereto with a C-shaped retainer, and a bottom end riveted to a bracket, which supports a wheel.

The compression spring is coiled on the shaft and covered by a sleeve, with the spring confined between an inside wall of the axial sleeve and a stop flange around the periphery of the shaft. This structure imparts a downward pressure to the shaft relative to the axial sleeve. The compression spring is adjusted automatically, subject to the loading status of the horizontal jack, keeping the wheel, that is supported on the bracket, in pressing contact with the ground (ground surface). Accordingly, when the jack is bearing a load, the rear wheels remain in pressing contact with the ground surface, as the compression springs adjust each of the rear wheels to compensate for the load. Also, when the jack is not bearing a load, the compression springs adjust each of the rear wheels in accordance with the topography of the surface over which the jack rides.

The disclosed subject matter is also directed to a wheel mounting structure. The wheel mounting structure includes a wheel unit including a wheel, and a shaft that is coupled to the wheel unit such that the wheel unit is rotatable about the shaft. The shaft is designed so as to be coupled to a portion of a structure, for example, a horizontal or floor jack. There is a spring that is coiled about at least a portion of the shaft. The spring is movable between a relaxed position, when the structure is not subjected to a load, and compressed positions, when the structure is subjected to a load. This movement of the spring allows the wheel to maintain contact with a surface.

BRIEF DESCRIPTION OF THE DRAWINGS

Attention is now directed to the drawings where corresponding or like numerals or characters indicate corresponding or like components. In the drawings.

DETAILED DESCRIPTION OF THE DRAWINGS

In this document, references are made to directions, such as upper, lower, top, bottom, up, down, upward, downward, front, rear, forward, backward, vertical, horizontal, and variations thereof. These directional references are exemplary, to show the disclosed subject matter in a typical orientation, and are in no way limiting.

Figure 1:
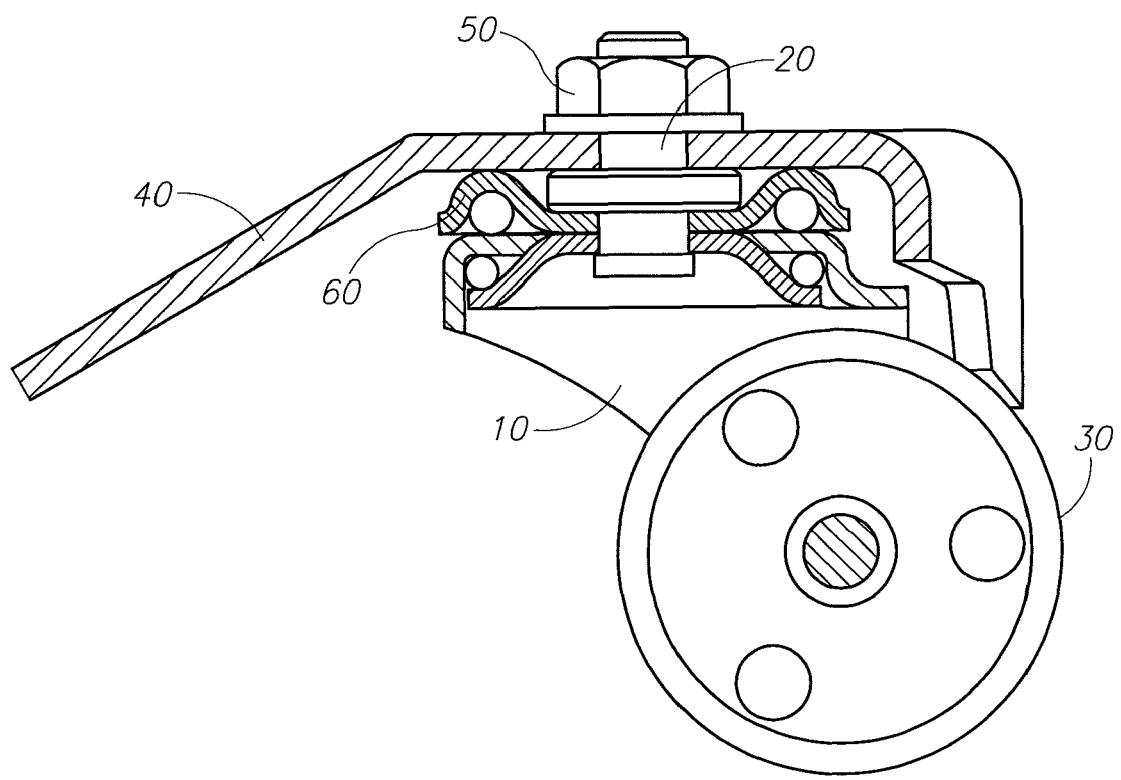
FIG. 1 is a schematic drawing showing the rear wheel structure of a horizontal jack according to the prior art.
Figure 2:
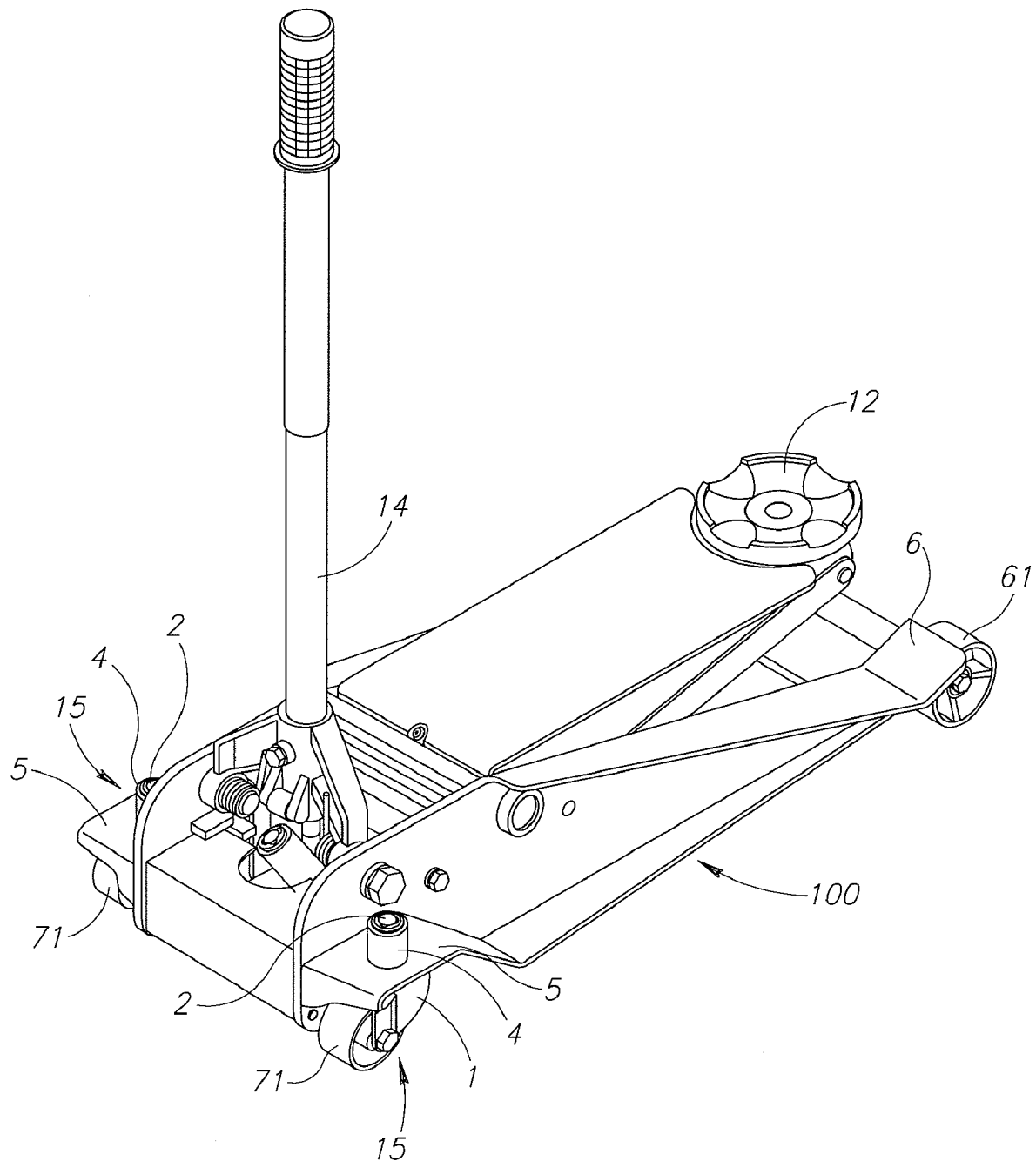
FIG. 2 is a perspective view of the disclosed shock-absorbing wheel mounting structure in an exemplary use on a jack.

Referring to FIG. 2, a shock-absorbing wheel mounting structure 15 is shown, for example, as part of a horizontal or floor jack 100. The wheel mounting structure 15 is installed in the rear wheel mount 5 of the horizontal jack 100, so that the wheels (two front wheels 61 and two rear wheels 71) of the horizontal jack 100 are always in contact with the ground (ground surface). The rear wheels 71 are typically castor or castor-type wheels.

For description purposes, and continuing to refer to FIG. 2, the front side or front of the jack 100 is the side proximate the saddle 12, that contacts the load, and the rear side or rear of the jack 100 is the side opposite the front side, or the side proximate to the handle 14 of the jack 100.

Figure 3:
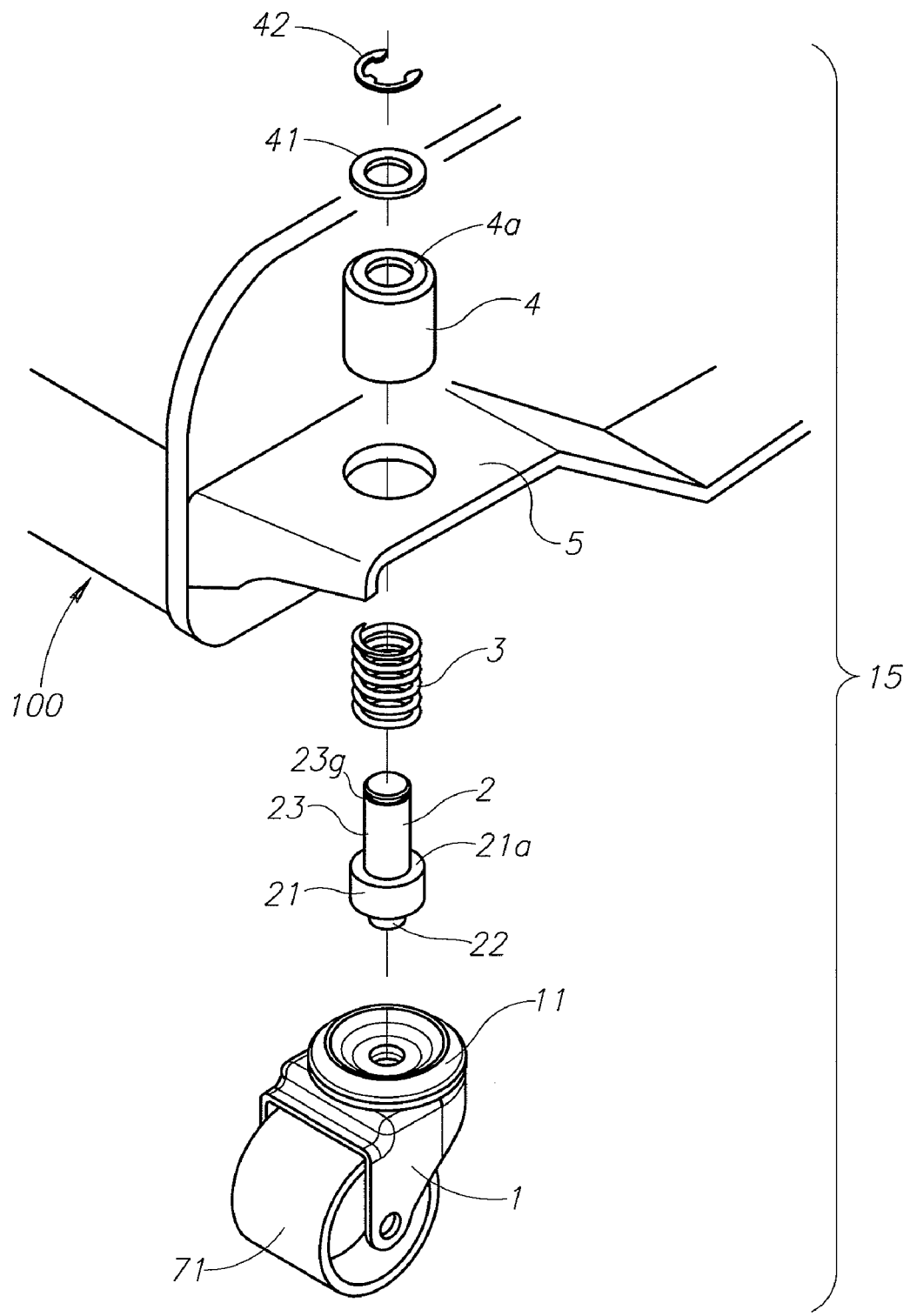
FIG. 3 is an exploded view of the shock-absorbing wheel mounting structure of FIG. 2.

Referring to FIG. 3, the shock-absorbing wheel mounting structure 15 includes a bracket 1, a shaft 2, a compression spring 3, and an axial sleeve 4.

The bracket 1 is a substantially U-shaped frame, that pivotally supports a wheel 71. A ball bearing 11 is at the top side of the bracket 1, while an auxiliary ball bearing 11a, below the ball bearing 11, is typically part of the bracket 1.

Figure 4:
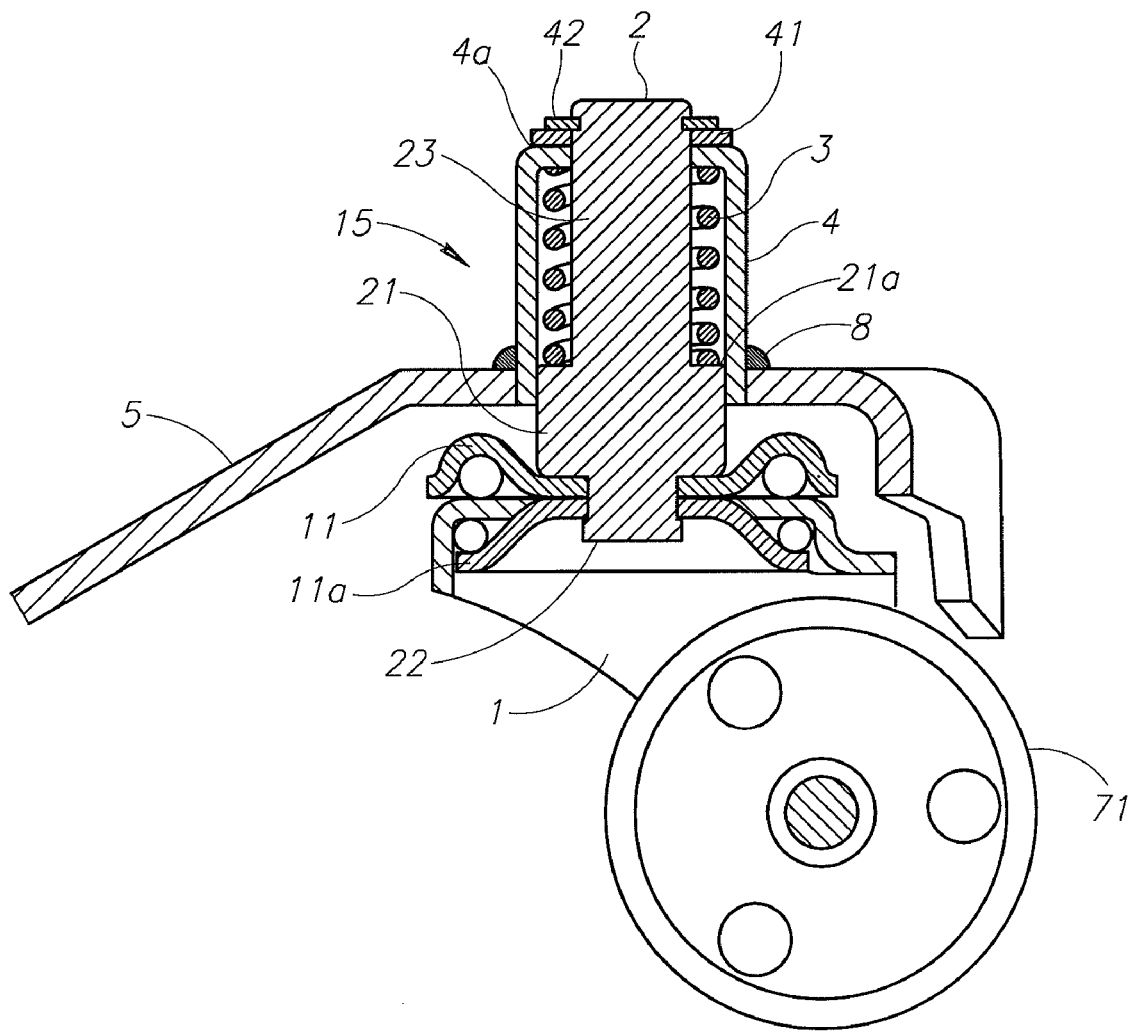
FIG. 4 is a sectional view of the shock-absorbing wheel mounting structure of FIG. 2 when the jack is not supporting a load.

The shaft 2 has a shaft body 23 and a stop flange 21 extending around the periphery of the bottom end of the shaft body 23, and is supported above the ball bearing 11. A bottom extension 22 extends axially downwardly from the bottom end of the shaft body 23, and is inserted into the ball bearing 11 of the bracket 1. The bottom extension 22 is typically also riveted thereto, as shown in FIG. 4. A locating groove 23g extends around the periphery of the top end of the shaft body 23.

The compression spring 3 is coiled around the body 23 of the shaft 2 and is supported on the shoulder 21a on the stop flange 21. The spring power of the compression spring 3 is, for example, designed to be greater than ¼ of the net weight of the horizontal jack 100, but less than ½ of the net weight of the horizontal jack 100.

The axial sleeve 4 is affixed to the rear wheel mount 5 of the horizontal jack 100 by any suitable mounting method. The axial sleeve 4 is typically directly welded to the rear wheel mount 5 (for example, at the welding area 8 in FIG. 4). The axial sleeve 4 is a hollow cap covering and enveloping the shaft 2 and the compression spring 3, while allowing the top end 23a of the shaft body 23 to protrude over the top side 4a of the axial sleeve 4. The axial sleeve 4, coupled with the shoulder 21a on the stop flange 21, confines the spring 3. A C-shaped retainer 42 is fastened to the locating groove 23g of the shaft body 23, to secure the shaft 2 to the axial sleeve 4. A washer 41 is mounted on the body 23 of the shaft 2, and is supported between the top side 4a of the axial sleeve 4 and the C-shaped retainer 42.

The bracket 1, shaft 2, compression spring 3, axial sleeve 4, washer 41 and C-shaped retainer 42, combine with the wheel 71, to form a shock-absorbing wheel assembly 15, which is mounted on the rear wheel mount 5 of the horizontal jack 100. The positioning of the compression spring 3, renders the axial sleeve 4 and rear wheel mount 5 vertically movable relative to the shaft 2. This arrangement maintains each of the wheels 71 in pressing contact with the ground (ground surface). Accordingly, when the horizontal jack 100 is not lifting a load (see FIG. 4) or bearing a load (see FIG. 5), the four wheels (two front wheels 61 and two rear wheels 71) of the horizontal jack 100 are constantly maintained in pressing contact with the ground (ground surface). This prevents impact or damage to the ground by the wheels 61, 71 of the horizontal jack 100, decreases the noise associated with uneven wheels when the jack 100 is rolled, and avoids unstable situations caused by the continuous force from the load on the jack 100.

In an exemplary operation, as shown in FIG. 2, two shock-absorbing wheel assemblies 15 are bilaterally mounted on the two rear wheel mounts 5 at the rear side of the horizontal jack 100. The jack 100 has two front wheels 61 respectively pivotally mounted on the two front wheel mounts 6 at the front of the jack 100.

Figure 5:
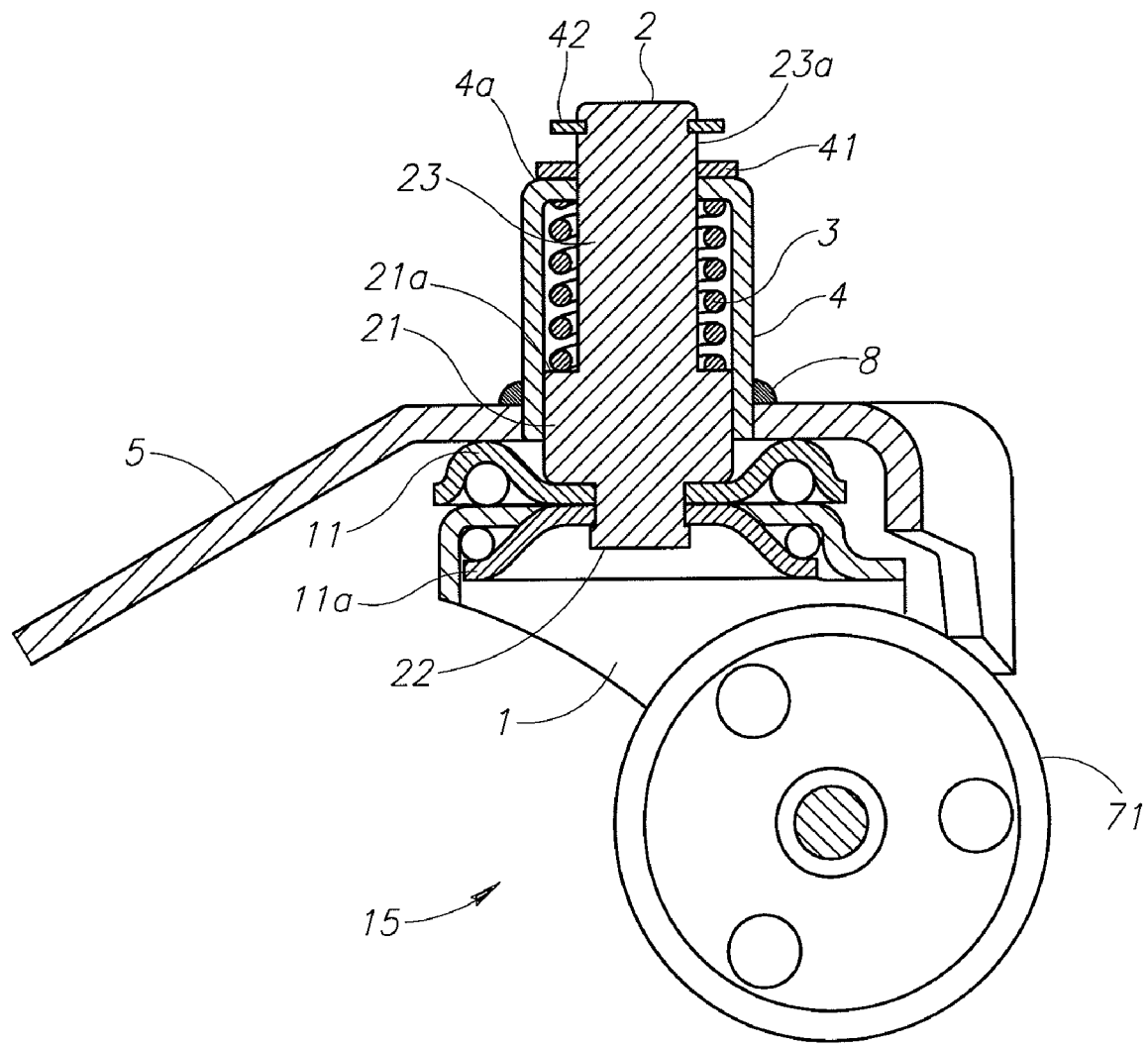
FIG. 5 is a sectional view of the shock-absorbing wheel mounting structure of FIG. 2, when the jack is supporting a load.

The spring power of the compression spring 3 is, for example, designed to be greater than ¼ of the net weight of the horizontal jack 100, but less than ½ of the net weight of the horizontal jack 100. When the horizontal jack 100 is not under a load (as shown in FIG. 4), the spring 3 automatically adjusts the rear wheels 71, keeping the four wheels 61, 71 of the horizontal jack 100 on the same plane (e.g., the ground surface) or surface, if not planar. When the horizontal jack 100 is under (carries) a load, for example, a heavy load, the compression spring 3 moves from an extended or relaxed position (FIG. 4) to a compressed position (FIG. 5). In this compressed position, the bracket 1, via the ball bearing 11, may contact the respective rear wheel mount 5. This arrangement of components allows the jack 100 to be suitable for long-term load bearing use.

Figure 6A:
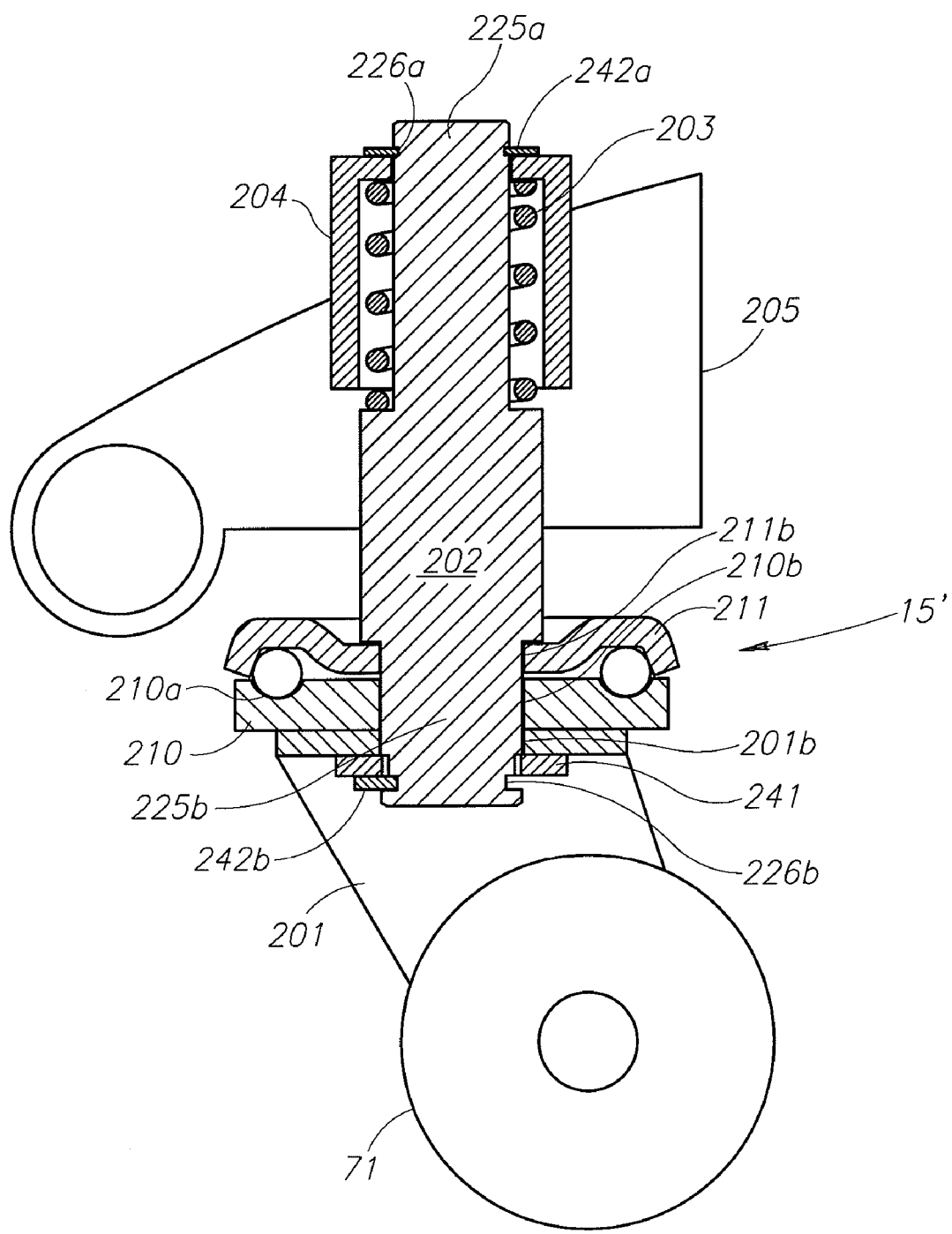
FIG. 6A is cross-sectional view of an alternate shock-absorbing wheel-mounting structure of the disclosed subject matter in an exemplary use on a jack.
Figure 6B:
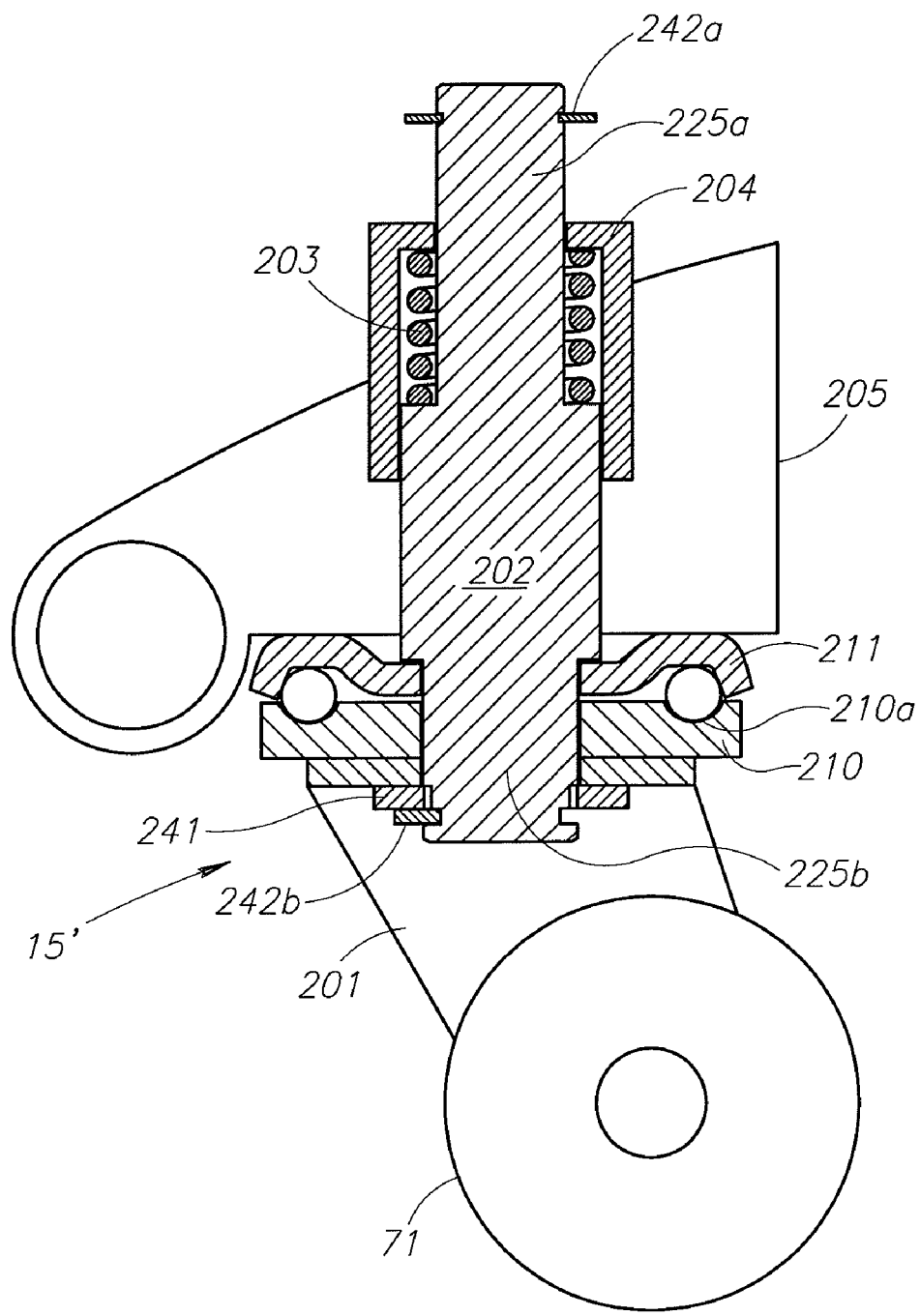
FIG. 6B is a cross-sectional view of the wheel mounting structure of FIG. 6A, when the jack is supporting a load.

FIGS. 6A and 6B show an alternate wheel mounting structure 15', for example, for use with a horizontal jack (such as horizontal jack 100, as shown in FIG. 2) at the rear wheels (opposite the load contacting front side of the jack), as a rear wheel mount 205. The wheel mounting structure 15' is similar in structural and operational aspects to the wheel mounting structure 15, shown in FIGS. 2-5 and described above. Similar components are indicated with numbers in the "200's," and their descriptions correspond with those for the requisite components above. Different components are detailed below.

The wheel mounting structure 15' includes a bracket 201, a shaft 202, a compression spring 203, and an axial sleeve 204. The bracket 201 is similar to the bracket 1, shown and described above, and is a substantially U-shaped frame, that pivotally supports a wheel 71. The bracket 201 supports a plate 210, that includes a circular groove 210a to support a ball bearing 211.

The shaft 202 has an upper shoulder 224a extending around the periphery of the upper end of the shaft 202, to support the spring 203. The spring 203 is coiled around an upper stem portion 225a of the shaft 202 and is covered by the axial sleeve 204. A C-shaped retainer 242a or the like, fits in a groove 226a of the upper stem portion 225a to serve as a stop surface for the axial sleeve 204, to keep it on the shaft 202.

A lower stem portion 225b of the shaft 202 extends through central openings 211b, 210b, 201b, in the ball bearing 211, plate 210 and bracket 201, respectively. The shaft 202 has a lower shoulder 224b of a diameter larger than the central openings 211b, 210b, 201b of the ball bearing 211, plate 210 and bracket 201, respectively. This lower shoulder 224b, coupled with a large washer 241 and C-shaped retainer 242b in a groove 226b of the lower stem portion 225b, retains the bracket 201 in a confined yet rotatable arrangement on the shaft 202.

In exemplary operations, when the horizontal jack employing the wheel mounts 15' for its rear wheels 71 (also element 71 in FIG. 2) is not under a load (as shown in FIG. 6A), the spring 203 automatically adjusts the pressure, keeping the four wheels of the horizontal jack 100 on the same plane (e.g., the ground surface). When the horizontal jack is under (carries) a load, for example, a heavy load, the compression spring 203 moves from an extended or relaxed position (FIG. 6A) to a compressed position (FIG. 6B). In this compressed position, the bracket 201, via the ball bearing 211, may contact the respective rear wheel mount 205. This arrangement of components allows the jack long-term load bearing use.

Figure 7A:
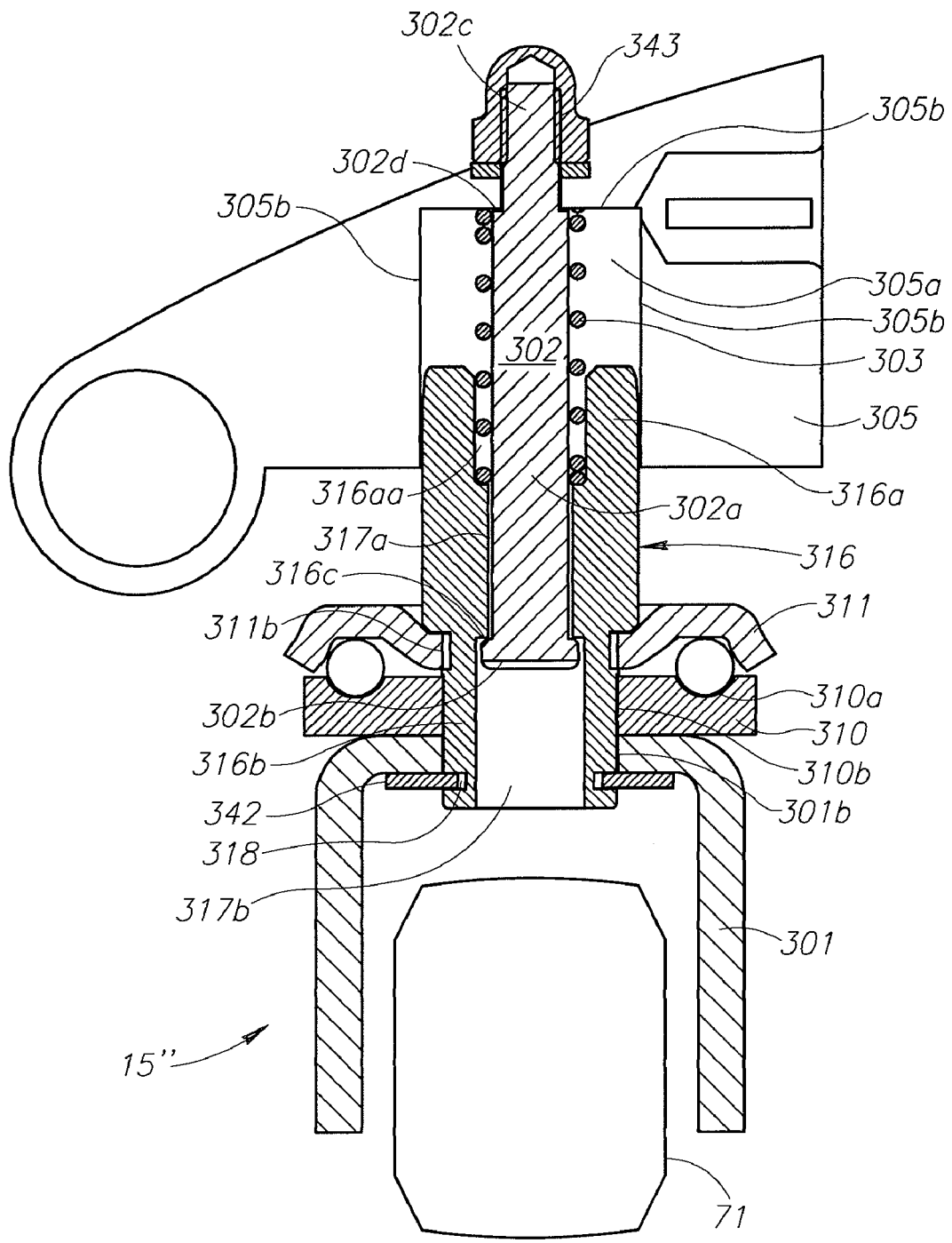
FIG. 7A is cross-sectional view of another alternate shock-absorbing wheel-mounting structure of the disclosed subject matter in an exemplary use on a jack.
Figure 7B:
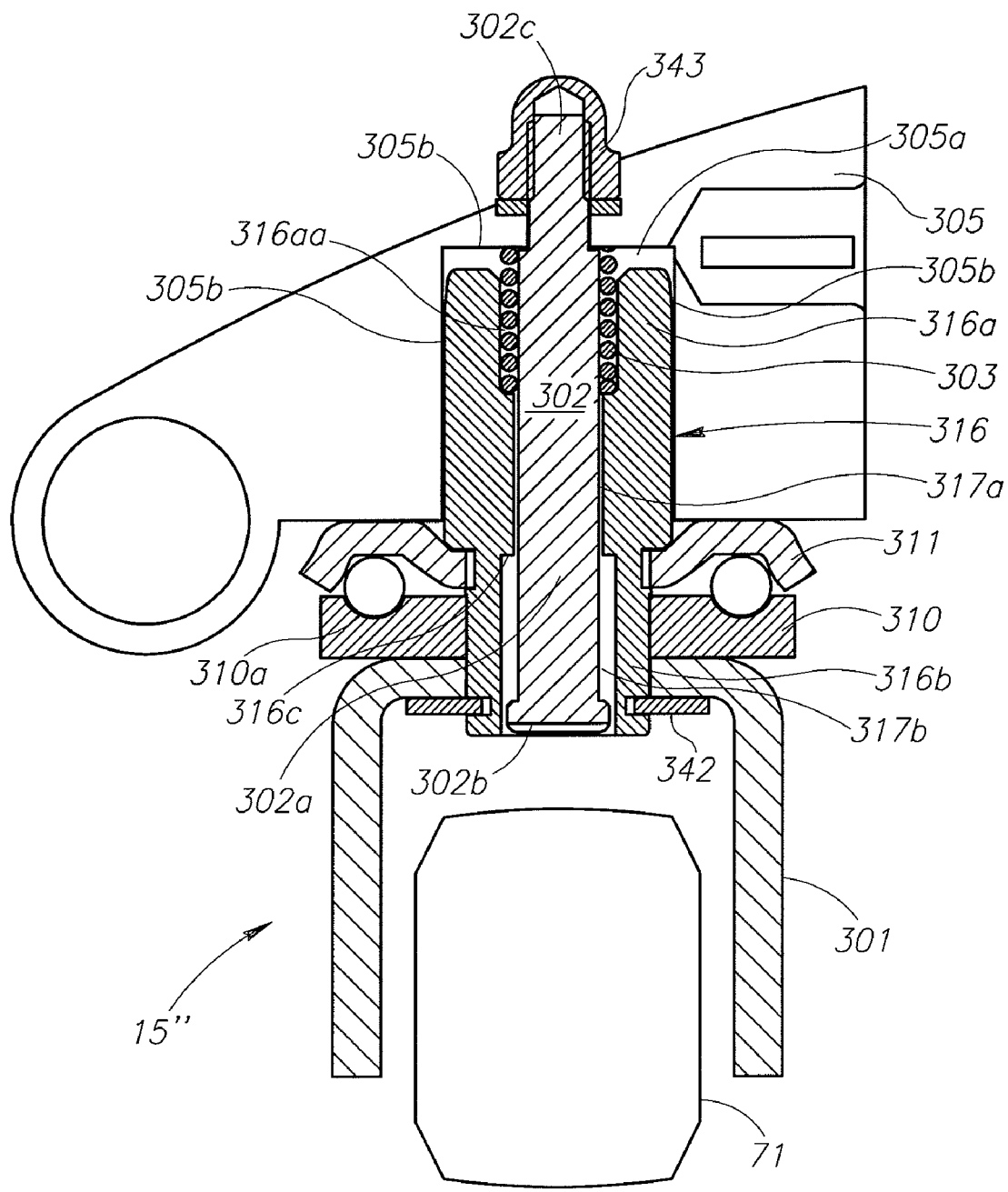
FIG. 7B is a cross-sectional view of the wheel mounting structure of FIG. 7A, when the jack is supporting a load.

FIGS. 7A and 7B show another alternate wheel mounting structure 15", for example, for use with a horizontal jack (such as horizontal jack 100, as shown in FIG. 2) at the rear wheels (on the rear side of the jack), as a rear wheel mount 305. The wheel mounting structure 15" is similar in structural and operational aspects to the wheel mounting structures 15, 15' shown in FIGS. 2-6B and described above. Similar components are indicated with numbers in the "300's," and their descriptions correspond with those for the requisite components above. Different components are detailed below.

The wheel mounting structure 15" includes a bracket 301, a shaft 302, slideable and rotatable in a body 316, and a compression spring 303. The bracket 301 is similar to the brackets 1 and 201, shown and described above, and is a substantially U-shaped frame, that pivotally supports a wheel 71. The bracket 301 supports a plate 310, that includes a circular groove 310*a* to support a ball bearing 311.

The rear wheel mount 305 includes a cavity 305*a* that receives the body 316, the shaft 302, and the spring 303 is coiled around (over) the shaft 302. The spring 303 seats between the shaft 302 and a cut out area 316*aa* of the upper portion 316*a* of the body 316 and a portion of the cavity 305*a*, so as to be confined, similar to that for the axial sleeves 4, 204, detailed above. The body 316 includes a central bore 317*a* of a diameter slightly greater then the central portion 302*a* of the shaft 302, to allow for vertical sliding and rotation of the shaft 302. The body 316 also includes a lower bore 317*b*, of a diameter larger than the end 302*b* of the shaft 302.

The body 316 includes a lower portion 316*b* of a diameter less than that of the upper portion 316*a*. The upper portion 316*a* joins to the lower portion 316*b* at a shoulder 316*c*. The shoulder 316*c* serves to limit upward travel of the shaft 302 by serving as a stop surface for the end 302*b*. The lower portion 316*b* extends through central openings 311*b*, 310*b*, 301*b* of the ball bearing 311, plate 310 and bracket 301, respectively. This lower shoulder 316*c*, coupled with a C-shaped retainer 242 in a groove 318 of the lower body portion 316*b*, retain the bracket 301 in a confined yet rotatable arrangement on the body 316.

The shaft 302 includes a stem 302*c*, extending from the central portion 302*a*. The stem 302*c* is of a lesser diameter than the central portion 302*a*, and the junction of these portions 302*a*, 302*c* defines a shoulder 302*d*, that abuts upper wall 305*b* of the cavity 305*a*, serving as an upward limit of travel for the shaft 302. The stem 302*c* is capped with a nut 343 or the like, that holds the shaft 302, and accordingly, the wheel mounting structure 15" on the rear wheel mount 305.

In exemplary operations, when the horizontal jack employing the wheel mounts 15" for its rear wheels 71 (also element 71 in FIGS. 2, 6A and 6B) is not under a load (as shown in FIG. 7A), the spring 303 automatically adjusts the pressure, keeping the four wheels of the horizontal jack 100 on the same plane (e.g., the ground surface). When the horizontal jack is under (carries) a load, for example, a heavy load, the compression spring 303 moves from an extended or relaxed position (FIG. 7A) to a compressed position (FIG. 7B). In this compressed position, the bracket 301, via the ball bearing 311, may contact the respective rear wheel mount 305. This arrangement of components renders the jack suitable for long-term load bearing use.

While preferred embodiments of the disclosed subject matter have been described in detail for purposes of illustration, various modifications and enhancements may be made without departing from the spirit and scope of the disclosed subject matter. Accordingly, the disclosed subject matter is not to be limited except as by the appended claims.

What is claimed:

1. A shock-absorbing wheel mounting structure comprising:
   an axial sleeve vertically fixed and mounted on a horizontal jack;
   a shaft vertically slideably mounted in said axial sleeve, said shaft having a top end extending out of a top side of said axial sleeve, a bottom end connected to a bracket that supports a wheel, and a stop flange extending around the periphery thereof above said bracket; and
   a compression spring sleeved onto said shaft and stopped between said stop flange of said shaft and an inside wall of said axial sleeve and adapted to impart a downward pressure to said shaft relative to said axial sleeve;
   wherein said shaft has at least one locating groove extending around the periphery of the top end thereof, and at least one C-shaped retainer respectively fastened to said at least one locating groove outside said axial sleeve to secure said shaft to said axial sleeve.

2. The shock-absorbing wheel mounting structure as claimed in claim 1, wherein the bottom end of said shaft is riveted to said bracket.

3. The shock-absorbing wheel mounting structure as claimed in claim 1, wherein said compression spring has a spring power greater ¼ of the net weight of said horizontal jack but smaller than ½ of the net weight of said horizontal jack.

4. The shock-absorbing wheel mounting structure as claimed in claim 1, wherein said axial sleeve is welded to a wheel mount of said horizontal jack.

5. The shock-absorbing wheel mounting structure as claimed in claim 1, wherein said axial sleeve is affixed to a rear wheel mount of said horizontal jack.

* * * * *